(12) United States Patent
Zhang

(10) Patent No.: US 7,864,721 B2
(45) Date of Patent: *Jan. 4, 2011

(54) METHOD AND APPARATUS FOR TRANSMITTING DATA

(75) Inventor: Yan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/817,542

(22) Filed: Jun. 17, 2010

(65) Prior Publication Data

US 2010/0284321 A1 Nov. 11, 2010

Related U.S. Application Data

(63) Continuation of application No. 11/968,531, filed on Jan. 2, 2008, which is a continuation of application No. PCT/CN2006/001346, filed on Jun. 15, 2006.

(30) Foreign Application Priority Data

Jun. 27, 2005 (CN) .......................... 2005 1 0079980
Jul. 26, 2005 (CN) .......................... 2005 1 0085375

(51) Int. Cl.
 *G08C 17/00* (2006.01)
(52) U.S. Cl. ........................................ 370/311; 370/203
(58) Field of Classification Search ........................ None
 See application file for complete search history.

(56) References Cited

U.S. PATENT DOCUMENTS 6,856,603 B1 2/2005 Vollmer et al.
6,876,636 B2 4/2005 Sinnarajah et al.
2005/0201269 A1* 9/2005 Shim et al. .................. 370/208
2005/0249142 A1 11/2005 Kim et al.
2005/0255862 A1* 11/2005 Jung et al. ............... 455/456.2
2007/0268933 A1* 11/2007 Wu et al. ..................... 370/474

(Continued)

FOREIGN PATENT DOCUMENTS

CN        1457162 A         11/2003

(Continued)

OTHER PUBLICATIONS

IEEE Standard, "Part 16: Air Interface for Fixed Broadband Wireless Access Systems Amendment for Physical and Medium Access Control Layers for Comined Fixed and Mobile Operation in Licensed Bands", IEEE Std. 802.16e 2005,pp. 1-19.*

(Continued)

*Primary Examiner*—Chi H Pham
*Assistant Examiner*—Mohammad S Adhami
(74) *Attorney, Agent, or Firm*—Finnegan, Henderson, Farabow, Garrett & Dunner LLP

(57) ABSTRACT

A method for transmitting data includes: acquiring a Multicast and Broadcast Service Mapping Information Element (MBS_MAP_IE) and MBS data corresponding to the MBS_MAP_IE; wherein the MBS_MAP_IE carries a parameter for indicating the frame position of the next MBS_MAP_IE; setting a sleep duration according to the parameter for indicating the frame position of the next MBS_MAP_IE; and acquiring the next MBS_MAP_IE and MBS data corresponding to the next MBS_MAP_IE when the sleep duration expires.

11 Claims, 2 Drawing Sheets

U.S. PATENT DOCUMENTS

2009/0109890 A1* 4/2009 Chow et al. ............... 370/312

FOREIGN PATENT DOCUMENTS

| CN | 1541492 A | 10/2004 |
|---|---|---|
| WO | WO 03/069933 A1 | 8/2003 |
| WO | WO 2005/079086 A2 | 8/2005 |
| WO | WO 2005/109695 A1 | 11/2005 |
| WO | WO 2005/109696 A1 | 11/2005 |

OTHER PUBLICATIONS

Chang, et al., "Enhanced Broadcast/Multicast Capabilities, "IEEE 802.16 Broadband Wireless Access Working Group, pp. 1-11 (2004).

IEEE Standards, "Part 16: Air Interface for Fixed Broadband Wireless Access Symptoms, Amendment 2: Physical and Medium Access Control Layers for Combined Fixed and Mobile Operation in Licensed Bands", IEEE Std 802.16e™ -2005, pp. 1-864 (2005).

IEEE Standards, Part 16: Air Interface for Fixed Broadband Wireless Access Systems, IEEE Std 802.16™ 2004, pp. 1-895 (2004).

International Preliminary Report for Application No. PCT/CN2006/001346, dated Aug. 29, 2006.

Son et al., "[MBS Clarification]". IEEE 802.16 Broadband Wireless Access Working Group, pp. 1-7 (2004).

Written Opinion for Application No. PCT/CN2006/001346, dated Aug. 29, 2006.

International Search Report from P.R. China in International Application No. PCT/CN2006/001346 mailed Oct. 19, 2006.

"Part 16: Air Interface for Fixed and Mobile Broadband Wireless Access Systems, Amendment for Physical and Medium Access Control Layers for Combined Fixed and Mobile Operation in Licensed Bands", Draft IEEE Standard for Local and metropolitan area networks, IEEE P802.16e/D7, pp. i-xxx and 1-630, (Apr. 2005).

"Part 16: Air Interface for Fixed and Mobile Broadband Wireless Access Systems, Amendment for Physical and Medium Access Control Layers for Combined Fixed and Mobile Operation in Licensed Bands", Draft IEEE Standard for Local and metropolitan area networks, IEEE P802.16e/D8, pp. i-xxvi and 1-610, (May 2005).

* cited by examiner

METHOD AND APPARATUS FOR TRANSMITTING DATA

CROSS-REFERENCE TO RELATED APPLICATIONS

This application is a continuation of U.S. patent application Ser. No. 11/968,531, filed on Jan. 2, 2008, which is a continuation of International Application No. PCT/CN2006/001346, filed on Jun. 15, 2006, which claims priority to Chinese Patent Application No. 200510079980.X, filed on Jun. 27, 2005, and Chinese Patent Application No. 200510085375.3, filed on Jul. 26, 2005, all of which are hereby incorporated by reference in their entireties.

FIELD OF THE TECHNOLOGY

The present invention relates to mobile communication technologies, and more particularly, to a method and apparatus for transmitting data in a multicast and broadcast service.

BACKGROUND OF THE INVENTION

Multicast and Broadcast Service (MBS) provides point-to-multipoint service transmitting data from one data source at the network side to multiple mobile terminals in a mobile network, so that network resources are shared and the utilization rate of the network resources is improved, especially the utilization rate of air interface resources. Further, the MBS is capable of implementing not only the multicast and broadcast for a pure-text and low-rate service such as a message, but also the multicast and broadcast for a high-rate multimedia service, and thus the MBS conforms to the trend of mobile data development. Therefore, the MBS has a vast range of prospects.

In the MBS, for the purpose of reducing power consumption of a mobile terminal, a sleep mode of the mobile terminal is provided. During sleep duration, e.g. a sleep window, agreed in advance by both the mobile terminal and a base station, the mobile terminal stays in a sleep state, the air interface disconnects with the base station temporarily, and the mobile terminal neither sends nor receives any service information; only during a listening duration agreed in advance by both the mobile terminal and the base station, the mobile terminal stays in a listening state and receives MBS data normally. Therefore, by applying the sleep mode of the mobile terminal, transmission requests of the mobile terminal in both an uplink and a downlink are reduced, and thus the power consumption of the mobile terminal is reduced.

In the MBS, when being in the sleep mode, the mobile terminal is capable of receiving the MBS data in a non macro diversity manner. In the non macro diversity manner, for the purpose of receiving the MBS data accurately by the mobile terminal, the base station transmits to the mobile terminal a Downlink Resource Allocation (DL_MAP) message carrying an MBS Mapping Information Element (MBS_MAP_IE) when transmitting a frame of the MBS data to the mobile terminal. The format of the MBS_MAP_IE is shown in table 1.

TABLE 1

| Syntax | Size(bits) | Notes |
|---|---|---|
| MBS_MAP_IE{ | — | — |
| Extended-2 DIUC | 4 | extended DIUC type |
| Length | 8 | length of the MBS_MAP_IE |
| MBS Zone identifier | 7 | MBS Zone identifier corresponding to the identifier provided by the BS at connection initiation |
| Macro diversity enhanced | 1 | Macro diversity enhanced indication: 0 = Non Macro-Diversity enhanced zone 1 = Macro-Diversity enhanced |
| If(Macro diversity enhanced = 1){ | | |
| Permutation | 2 | 0b00 = PUSC permutation 0b01 = FUSC permutation 0b10 = Optional FUSC permutation 0b11 = Adjacent subcarrier permutation |
| Idcell | 6 | Cell identity |
| OFDMA Symbol Offset | 7 | OFDMA symbol offset from the start of the MBS zone to the start of the current frame |
| DIUC change indication | 1 | DIUC change indication |
| if (DIUC change indication = 1) { | — | — |
| Reserved | 1 | Reserved bit |
| Boosting | 3 | Power boost 000: not boosted; 001: +6 dB; 010: −6 dB; 011: +9 dB; 100: +3 dB; 101: −3 dB; 110: −9 dB; 111: −12 dB |
| DIUC | 3 | — |
| No. Subchannels | 4 | the number of subchannels occupied by the MBS_MAP message |
| NO. OFDMA symbols | 2 | the number of OFDMA symbols occupied by the MBS_MAP message |
| Repetition Coding Indication | 2 | Repetition Coding Indication: 0b00 - No repetition coding 0b01 - Repetition coding of 2 0b10 - Repetition coding of 4 0b11 - Repetition coding of 6 |
| } | — | — |
| }else{ | | |

TABLE 1-continued

| Syntax | Size(bits) | Notes |
| --- | --- | --- |
| DIUC | 4 | — |
| CID | 12 | the last 12 bits of MBS connection number |
| OFDMA Symbol Offset | 8 | OFDMA symbol offset from the MBS corresponding to CID to the start of the current frame |
| Subchannel offset | 6 | subchannel offset from the MBS service corresponding to CID to the start of the current frame |
| Boosting | 3 | Power boost 000: not boosted; 001: +6 dB; 010: −6 dB; 011: +9 dB; 100: +3 dB; 101: −3 dB; 110: −9 dB; 111: −12 dB |
| SLC_3_indication | 1 | sleep indication information |
| NO. OFDMA Symbols | 6 | the number of OFDMA symbols occupied by the MBS corresponding to CID |
| NO. Subchannels | 6 | the number of subchannels occupied by the MBS corresponding to CID |
| Repetition Coding Indication | 2 | repetition Coding Indication: 0b00 - No repetition coding 0b01 - Repetition coding of 2 0b10 - Repetition coding of 4 0b11 - Repetition coding of 6 |
| if(SLC_3_indication = 1) { | — | — |
| Next MBS frame offset | 8 | the offset from the next frame including an MBS_MAP message to the current frame |
| Next MBS OFDMA Symbol offset | 8 | OFDMA symbol offset from the next MBS_MAP message to the start of the frame including the next MBS_MAP message |
| } | — | — |
| } | — | — |
| if !(byte boundary) { | | |
| Padding Nibble | | Pad to Byte boundary |
| } | | |
| } | | |

With reference to table 1, when the mobile terminal is in the sleep mode and receives the MBS data in the non macro diversity manner, the MBS_MAP_IE transmitted to the mobile terminal by the base station carries the parameters for indicating the specific MBS resources, OFDMA Symbol Offset and Subchannel offset. The parameter OFDMA Symbol Offset indicates the symbol offset of the MBS data in the data frame currently received, and the parameter Subchannel offset indicates the subchannel offset of the MBS data in the subchannel of the data frame currently received. The parameter NO.OFDMA Symbols indicate the number of symbols occupied by the MBS data, and the parameter NO. Subchannels indicate the number of subchannels occupied by the MBS data. In this way, according to the parameter OFDMA Symbol Offset, the parameter Subchannel offset, the parameter NO.OFDMA Symbols and the parameter NO. Subchannels, the mobile terminal may acquire the MBS resources and receive the MBS data accurately.

With reference to table 1, when the mobile terminal is in the sleep mode and receives the MBS data in the non macro diversity manner, the MBS_MAP_IE transmitted to the mobile terminal by the base station further carries the parameter SLC_3_indication=1 for indicating that the mobile terminal adopts the sleep mode and the frame position of the next Multicast and Broadcast Service Mapping (MBS_MAP) message needs to be indicated. Moreover, the MBS_MAP_IE correspondingly carries parameters for indicating the receiving position of the next MBS_MAP message, Next MBS frame offset and Next MBS OFDMA Symbol offset. Here, the parameter Next MBS frame offset indicates the frame offset from the next MBS_MAP message to the data frame currently received, and the parameter Next MBS OFDMA Symbol offset indicates the symbol position of the next MBS_MAP message, i.e. the symbol offset from the next MBS_MAP message to the header of the frame including the next MBS_MAP message. In this way, according to the parameters Next MBS frame offset and Next MBS OFDMA Symbol offset carried in the MBS_MAP_IE currently received, the mobile terminal wakes up to listen to the MBS_MAP message in subsequent processes. According to the relevant information carried in the MBS_MAP message currently received, the mobile terminal determines the next MBS resources so as to acquire the next MBS data.

It can be seen from the above description, in the conventional technologies, when the mobile terminal is in the sleep mode and receives the MBS data in the non macro diversity manner, the base station indicates the MBS resources repetitively. The reason is as follows: in the MBS_MAP_IE currently received from the base station, the definition of the parameter SLC_3_indication=1 indicates that the frame position of the next MBS_MAP message needs to be indicated, and the parameters Next MBS frame offset and Next MBS OFDMA Symbol offset indicates the receiving position of the next MBS_MAP message; the next MBS_MAP message sent by the base station to the mobile terminal indicates the next MBS resources; accordingly, the mobile terminal has to wake up to receive the next MBS_MAP message in the subsequent processes so as to obtain the next MBS resources through the MBS_MAP message. However, in the next MBS_MAP_IE sent by the base station, the parameters OFDMA Symbol offset and Subchannel offset also indicates the next MBS resources. Therefore, the base station indicates the MBS resources repetitively. But the mobile station not only has to wake up to acquire the MBS resources when receiving the MBS_MAP_IE, but also has to wake up to acquire the MBS resources again when receiving the MBS_MAP message, and the MBS resources acquired respectively when receiving the MBS_MAP_IE and the MBS_MAP message are identical. Therefore, the sleep duration of the mobile terminal is reduced, the power consumption of the mobile terminal increases, and mobility of the mobile terminal decreases.

SUMMARY OF THE INVENTION

The present invention provides a method for transmitting data so as to increase sleep duration of the mobile terminal and reduce power consumption of the mobile terminal.

A method for transmitting data includes:

acquiring a Multicast and Broadcast Service Mapping Information Element (MBS_MAP_IE) and MBS data corresponding to the MBS_MAP_IE, and the MBS_MAP_IE carries a parameter for indicating the frame position of the next MBS_MAP_IE;

setting a sleep duration according to the parameter for indicating the frame position of the next MBS_MAP_IE; and acquiring the next MBS_MAP_IE and MBS data corresponding to the next MBS_MAP_IE when the sleep duration expires.

An apparatus for transmitting data includes:

a first unit, for acquiring a Multicast and Broadcast Service Mapping Information Element (MBS_MAP_IE) and MBS data corresponding to the MBS_MAP_IE; wherein the MBS_MAP_IE carries a parameter for indicating the frame position of the next MBS_MAP_IE and acquiring the next MBS_MAP_IE and MBS data corresponding to the next MBS_MAP_IE when a sleep duration expires; and a second unit, for setting the sleep duration according to the parameter for indicating the frame position of the next MBS_MAP_IE.

It can be seen that when the mobile terminal is in a sleep mode and receives MBS data in a non macro diversity manner, the method provided by the present invention has the following advantages:

In the present invention, a parameter for indicating the frame position of the next MBS_MAP_IE is added. It is unnecessary for the mobile terminal to receive the next MBS_MAP message, and the MBS resources are acquired only by receiving each MBS_MAP_IE. Therefore, the sleep duration of the mobile terminal increases, and the power consumption of the mobile terminal reduces.

DETAILED DESCRIPTION OF THE INVENTION

Figure 1:
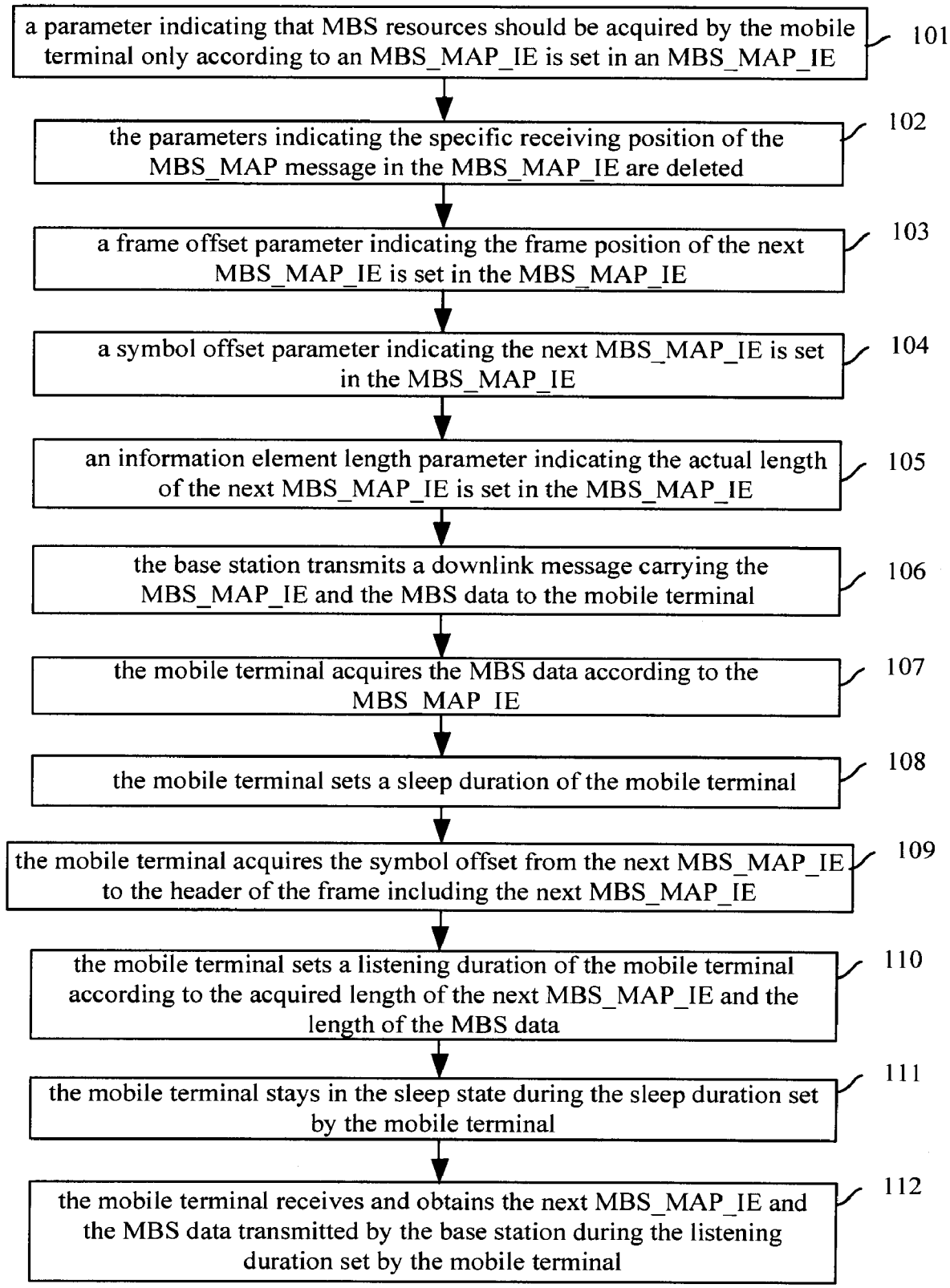
FIG. 1 is a flowchart illustrating a method for transmitting data according to an embodiment of the present invention.

Preferred embodiments of the present invention are now made to the following description in conjunction with the accompanying drawings so as to provide a more explicit explanation of the object, technical solution and beneficial effects of the present invention.

When a mobile terminal is in a sleep mode and receives MBS data in a non macro diversity manner, a base station transmits both MBS data and a DL_MAP message carrying an MBS_MAP_IE to the mobile terminal. Therefore, for the purpose of receiving the MBS data, the mobile terminal wakes up to receive the MBS_MAP_IE at the time point when the base station transmits the MBS_MAP_IE. While in the conventional technologies, the mobile terminal needs to wake up to acquire MBS resources at the time point when the base station transmits the MBS_MAP message, and the MBS resources obtained through the MBS_MAP message may also be acquired through the MBS_MAP_IE in the DL_MAP. It can be seen that the MBS_MAP message is a redundant message for the mobile terminal. Actually only the MBS_MAP_IE every time sent by the base station needs to be obtained by the mobile terminal and necessary MBS resources can be obtained, so that the MBS data transmitted by the base station every time is received normally.

According to the above, the present invention provides a method for transmitting data, which includes: defining an MBS_MAP_IE of an MBS to indicate the frame position of the next MBS_MAP_IE of the MBS, transmitting the MBS_MAP_IE and MBS data corresponding to the MBS_MAP_IE to a mobile terminal, obtaining the MBS data by the mobile terminal according to the received MBS_MAP_IE, setting a sleep duration of the mobile terminal by the mobile terminal according to the frame position of the next MBS_MAP_IE indicated by the received MBS_MAP_IE and receiving the next MBS_MAP_IE and next MBS data by the mobile terminal when the sleep duration expires.

In the present invention, when the MBS_MAP_IE is transmitted to the mobile terminal, the MBS_MAP_IE is carried in a downlink message, and then the downlink message is transmitted to the mobile terminal. The downlink message may be an original DL_MAP message or a message defined by the present invention.

Moreover, for the purpose of ensuring that the mobile terminal may receive the next MBS_MAP_IE accurately when the sleep duration expires, the present invention provides two specific implementation embodiments. In the first implementation embodiment, a parameter indicating the frame offset of the next MBS_MAP_IE, a parameter indicating the symbol offset of the next MBS_MAP_IE and a parameter indicating the information element length of the next MBS_MAP_IE in one MBS_MAP_IE are set; and then the MBS_MAP_IE sent to the mobile terminal carries the value of the parameter indicating the frame offset of the next MBS_MAP_IE, the value of the parameter indicating the symbol offset of the next MBS_MAP_IE and the value of the information element length of the next MBS_MAP_IE; the mobile terminal, when the sleep duration expires, only receives and obtains the next MBS_MAP_IE carried in a downlink message, not receives the whole frame of the downlink message according to the value of the parameter indicating the symbol offset of the next MBS_MAP_IE and the value of the information element length of the next MBS_MAP_IE. In the second implementation embodiment, the mobile terminal receives the whole frame of the downlink message and obtains the next MBS_MAP_IE from the downlink message by parsing the downlink message.

Further, it should be noted that the MBSs corresponding to the MBS_MAP_IE and the MBS data in the present invention corresponds to the same MBS connection identifier.

Two embodiments respectively corresponding to the two implementation embodiments provided by the present invention for ensuring that the next MBS_MAP_IE is received by the mobile terminal when the sleep duration expires are taken as examples to describe complete implementing processes of the present invention.

The first embodiment is described as follows.

FIG. 1 is a flowchart illustrating a method for transmitting data according to the first embodiment of the present invention. With reference to FIG. 1, when a mobile terminal is in a sleep mode and receives MBS data in a non macro diversity manner, the method for transmitting data according to the present invention includes the following processes.

At block 101, a parameter indicating that MBS resources are acquired by the mobile terminal only according to an MBS_MAP_IE is set in an MBS_MAP_IE.

In the conventional technologies, the parameter SLC_3_indication=1 is used to indicate that the mobile terminal adopts a sleep mode and the frame position of the next MBS_MAP message needs to be indicated, that is, the parameter SLC_3_indication=1 indicates that the mobile terminal receives the redundant MBS_MAP message in subsequent processes and acquires the MBS resources again according to the MBS_MAP message. Therefore, for the purpose of avoiding receiving the redundant MBS_MAP message, at this block, the parameter indicating that the MBS resources can be acquired by the mobile terminal only according to the MBS_MAP_IE is set in the MBS_MAP_IE, and specific processes are as follows.

The existing parameter SLC_3_indication=1 in the MBS_MAP_IE is redefined; the parameter SLC_3_indication=1 is set to indicate that the mobile terminal adopts the sleep mode and the receiving position of the next MBS_MAP_IE needs to be indicated. Or the parameter SLC_3_indication=1 is directly deleted and a predefined parameter is added, the predefined parameter indicating that the mobile terminal adopts the sleep mode and the receiving position of the next MBS_MAP_IE needs to be indicated.

In this way, by using the parameter set at this block indicating that the MBS resources can be acquired by the mobile terminal only according to the MBS_MAP_IE, it is unnecessary for the base station to send the MBS_MAP message to the mobile terminal, only the parameter indicating the next MBS_MAP_IE needs to be carried in the MBS_MAP_IE; and the mobile terminal may learn that it is unnecessary to receive the redundant MBS_MAP message and only the next MBS_MAP_IE needs to be received.

At block 102, the parameters indicating the specific receiving position of the MBS_MAP message in the MBS_MAP_IE, i.e. the parameter Next MBS frame offset and the parameter Next MBS OFDMA Symbol offset, are deleted.

At block 103, a frame offset parameter indicating the frame position of the next MBS_MAP_IE is set in the MBS_MAP_IE.

The frame offset parameter indicating the frame position of the next MBS_MAP_IE is used to indicate the frame offset from the next MBS_MAP_IE to the MBS_MAP_IE in the frame currently received. For example, the frame offset parameter indicating the frame position of the next MBS_MAP_IE may be set as Next MBS_MAP_IE frame offset.

At block 104, a symbol offset parameter indicating the next MBS_MAP_IE is set in the MBS_MAP_IE.

The symbol offset parameter indicating the next MBS_MAP_IE is used to indicate the symbol offset from the next MBS_MAP_IE to the header of the next frame including the next MBS_MAP_IE. For example, the symbol offset parameter indicating the next MBS_MAP_IE may be set as Next MBS_MAP_IE OFDMA Symbol offset.

At block 105, an information element length parameter indicating the actual length of the next MBS_MAP_IE is set in the MBS_MAP_IE.

The information element length parameter indicating the actual length of the next MBS_MAP_IE is used to indicate the specific length of the next MBS_MAP_IE, so that the mobile terminal may set a listening duration of the mobile terminal according to the specific frame length. For example, at this block, the information element length parameter may be set as Next MBS_MAP_IE Length.

By performing actions at blocks 101 to 105, in the present invention, the parameters relating to the next MBS_MAP message are deleted from the MBS_MAP_IE, and the parameters indicating the specific receiving position of the next MBS_MAP_IE and that indicating the length of the next MBS_MAP_IE is added.

Therefore, a redefined MBS_MAP_IE is acquired accordingly, and the specific format of the redefined MBS_MAP_IE is shown in table 2.

TABLE 2

| Syntax | Size(bits) | Notes |
| --- | --- | --- |
| MBS_MAP_IE{ | — | — |
| Extended-2 DIUC | 4 | extended DIUC type |
| Length | 8 | length of the MBS_MAP_IE |
| MBS Zone identifier | 7 | MBS Zone identifier corresponding to the identifier provided by the BS at connection initiation |
| Macro diversity enhanced | 1 | Macro diversity enhanced indication: 0 = Non Macro-Diversity enhanced zone 1 = Macro-Diversity enhanced |
| If(Macro diversity enhanced = 1){ | | |
| Permutation | 2 | 0b00 = PUSC permutation 0b01 = FUSC permutation 0b10 = Optional FUSC permutation 0b11 = Adjacent subcarrier permutation |
| Idcell | 6 | Cell identity |
| OFDMA Symbol Offset | 7 | OFDMA symbol offset from the start of the MBS zone to the start of the current frame |
| DIUC change indication | 1 | DIUC change indication |
| if (DIUC change indication = | — | — |

TABLE 2-continued

| Syntax | Size(bits) | Notes |
|---|---|---|
| 1) { | | |
| Reserved | 1 | Reserved bit |
| Boosting | 3 | Power boost<br>000: not boosted; 001: +6 dB;<br>010: −6 dB; 011: +9 dB;<br>100: +3 dB; 101: −3 dB;<br>110: −9 dB; 111: −12 dB |
| DIUC | 3 | — |
| No. Subchannels | 4 | the number of subchannels occupied by the MBS_MAP message |
| NO. OFDMA symbols | 2 | the number of OFDMA symbols occupied by the MBS_MAP message |
| Repetition Coding Indication | 2 | Repetition Coding Indication:<br>0b00 - No repetition coding<br>0b01 - Repetition coding of 2<br>0b10 - Repetition coding of 4<br>0b11 - Repetition coding of 6 |
| } | — | — |
| }else{ | | |
| DIUC | 4 | — |
| CID | 12 | the last 12 bits of MBS connection number |
| OFDMA Symbol Offset | 8 | OFDMA symbol offset from the MBS corresponding to CID to the start of the current frame |
| Subchannel offset | 6 | Subchannel offset from the MBS service corresponding to CID to the start of the current frame |
| Boosting | 3 | Power boost<br>000: not boosted; 001: +6 dB;<br>010: −6 dB; 011: +9 dB;<br>100: +3 dB; 101: −3 dB;<br>110: −9 dB; 111: −12 dB |
| SLC_3_indication | 1 | sleep indication information |
| NO. OFDMA Symbols | 6 | the number of OFDMA symbols occupied by the MBS corresponding to CID |
| NO. Subchannels | 6 | the number of subchannels occupied by the MBS corresponding to CID |
| Repetition Coding Indication | 2 | repetition Coding Indication:<br>0b00 - No repetition coding<br>0b01 - Repetition coding of 2<br>0b10 - Repetition coding of 4<br>0b11 - Repetition coding of 6 |
| if (SLC_3_indication = 1) { | | |
| Next MBS_MAP_IE frame offset | 8 | the frame offset from the frame including the next MBS_MAP_IE of the MBS to the current frame, and the MBS corresponding to the current CID |
| Next MBS_MAP_IE OFDMA Symbol offset | 8 | the OFDMA symbol offset from the next MBS_MAP_IE of the MBS to the header of the frame including the next MBS_MAP_IE, and the MBS corresponding to the current CID |
| Next MBS_MAP_IE Length | 8 | the length of the next MBS_MAP_IE of the MBS corresponding to the current CID |
| } | | |
| } | | |
| if !(byte boundary) { | | |
| Padding Nibble | | |
| } | | |
| } | | |

At block 106, at the frame time point when the base station transmits the MBS data to the mobile terminal, the base station transmits the downlink message carrying the MBS_MAP_IE and the MBS data to the mobile terminal.

The downlink message may be an existing DL_MAP message or a predefined message in the present invention.

Further, at this block, MBS_MAP_IE transmitted by the base station carries the value of the frame offset parameter indicating the frame position of the next MBS_MAP_IE, the value of the symbol offset parameter indicating the next MBS_MAP_IE and the value of the information element length parameter indicating the actual length of the next MBS_MAP_IE.

At block 107, the mobile terminal acquires the MBS_MAP_IE from the downlink message, and the mobile terminal learns that the MBS resources can be acquired according to the MBS_MAP_IE instead of the next MBS_MAP message according to the parameter in the MBS_MAP_IE which indicates that the MBS resources can be acquired only according to the MBS_MAP_IE by the mobile terminal, such as the parameter SLC_3_indication=1; therefore, the mobile terminal acquires the specific MBS data of this time according to the parameters of OFDMA Symbol Offset, Subchannel offset, NO.OFDMA Symbols and NO.Subchannels.

The mobile terminal acquires the symbol offset of the MBS data in the frame data currently received according to the OFDMA Symbol Offset, acquires the subchannel offset of the MBS data in the frame currently received according to the Subchannel offset, acquires the number of OFDMA symbols occupied by the MBS data according to the NO.OFDMA Symbols and acquires the number of subchannels occupied by the MBS data according to the NO.Subchannels, and thus the mobile terminal may receive the MBS data accurately.

At block 108, the mobile terminal sets a sleep duration of the mobile terminal according to the value of the frame offset parameter indicating the frame offset of the next MBS_MAP_IE in the MBS_MAP_IE when identifying the parameter indicating that the MBS resources can be acquired by the mobile terminal only according to the MBS_MAP_IE in the MBS_MAP_IE.

The mobile terminal learns that it is unnecessary to receive the MBS_MAP message in the subsequent processes to obtain the MBS resources again according to the parameter in the received MBS_MAP_IE indicating that the MBS resources can be acquired by the mobile terminal only according to the MBS_MAP_IE, such as the parameter SLC_3_indication=1 shown in table 2, that is, it is unnecessary to listen to the MBS_MAP message at the time point when the base station transmits the frame including the MBS_MAP message, so the mobile terminal may keep staying in the sleep state. Moreover, the mobile terminal acquires the frame offset from the next MBS_MAP_IE to the MBS_MAP_IE of the frame currently received according to the value of the frame offset parameter in the received MBS_MAP_IE indicating the frame offset of the next MBS_MAP_IE, such as the value of the Next MBS_MAP_IE frame offset shown in table 2, and then the mobile terminal sets the sleep duration according to the duration corresponding to the frame offset. For example, if the value of Next MBS_MAP_IE frame offset is 6, the mobile terminal may learn that the frame position of the next MBS_MAP_IE is 6 frames behind the frame including the MBS_MAP_IE, so the mobile terminal may set the sleep duration as duration of 6 frames. Therefore, it is ensured that the mobile terminal may be in the sleep state in the duration of 6 frames, so that the power consumption of the mobile terminal may be reduced. Moreover, the mobile terminal may be in a listening state and receive the next MBS_MAP_IE accurately after the duration of 6 frames, i.e. when the next MBS_MAP_IE arrives.

At block 109, the mobile terminal acquires the symbol offset from the next MBS_MAP_IE to the header of the frame including the next MBS_MAP_IE according to the value of the symbol offset parameter in the received MBS_MAP_IE indicating the symbol offset of the next MBS_MAP_IE.

The mobile terminal may acquire the symbol offset from the next MBS_MAP_IE to the header of the frame including the next MBS_MAP_IE according to the Next MBS_MAP_IE OFDMA Symbol offset shown in table 2.

At block 110, the mobile terminal acquires the actual length of the next MBS_MAP_IE according to the information element length parameter in the received MBS_MAP_IE indicating the information element length of the next MBS_MAP_IE corresponding to the mobile terminal. The mobile terminal acquires the actual length of the MBS data according to the parameter in the MBS_MAP_IE indicating the length of the MBS data. And then the mobile terminal sets the listening duration of the mobile terminal according to the acquired actual length of the next MBS_MAP_IE and the actual length of the MBS data.

It is supposed that the parameter in MBS_MAP_IE indicating the length of the MBS data is the NO. OFDMA Symbols shown in table 2. In addition, the actual length of the next MBS_MAP_IE indicates the length occupied by the next MBS_MAP_IE received by the mobile terminal in the subsequent process, that is, the mobile terminal may set the listening duration of the mobile terminal according to the length of the next MBS_MAP_IE, and it is unnecessary to receive the whole frame message including the MBS_MAP_IE.

At block 111, the mobile terminal stays in the sleep state during the sleep duration set by the mobile terminal. The air interface disconnects from the base station temporarily; and the mobile terminal neither sends nor receives any message.

At block 112, the mobile terminal receives and obtains the next MBS_MAP_IE and the MBS data transmitted by the base station when the set sleep duration expires, i.e. the mobile terminal receives and obtains the next MBS_MAP_IE and the MBS data transmitted by the base station during the listening duration set by the mobile terminal.

The mobile terminal sets the duration corresponding to the frame offset of the next MBS_MAP_IE as the sleep duration. Therefore, the time point when the set sleep duration expires is just the time point when the downlink message carrying the next MBS_MAP_IE arrives.

Moreover, at this block, the mobile terminal acquires the next MBS_MAP_IE by the following processes. The mobile terminal determines the symbol position of the next MBS_MAP_IE according to the acquired symbol offset from the next MBS_MAP_IE to the header of the frame including the next MBS_MAP_IE, and then the mobile terminal receives and acquires the next MBS_MAP_IE at the determined symbol position according to the acquired information element length of the next MBS_MAP_IE.

In the first embodiment, two parameters are added, with one indicating that MBS resources can be acquired only according to the next MBS_MAP_IE and the other indicating the frame position of the next MBS_MAP_IE. It is unnecessary for the mobile terminal to receive the next MBS_MAP message, and the MBS resources are acquired only by receiving each MBS_MAP_IE. Therefore, the sleep duration of the mobile terminal increases, and the power consumption of the mobile terminal reduces. Moreover, parameters in the MBS_MAP_IE for indicating the next MBS_MAP message are deleted. It is unnecessary for the base station to transmit the MBS_MAP message to the mobile terminal. Therefore, air interface resources are saved, and bandwidth efficiency is improved.

Further, in the first embodiment, the information element length of the next MBS_MAP_IE and the symbol offset from the next MBS_MAP_IE to the header of the frame including the next MBS_MAP_IE are indicated in the MBS_MAP_IE. Therefore it is advantageous for the mobile terminal to set a listening duration. It is unnecessary for the mobile terminal to receive the whole frame of a downlink message including an MBS_MAP_IE, and only the next MBS_MAP_IE in the downlink message needs to be received. Therefore, the power consumption of the mobile terminal is further reduced, the processing procedure is simplified for the mobile terminal, and processing complexity is reduced for the mobile terminal.

The second embodiment is described as follows.

Figure 2:
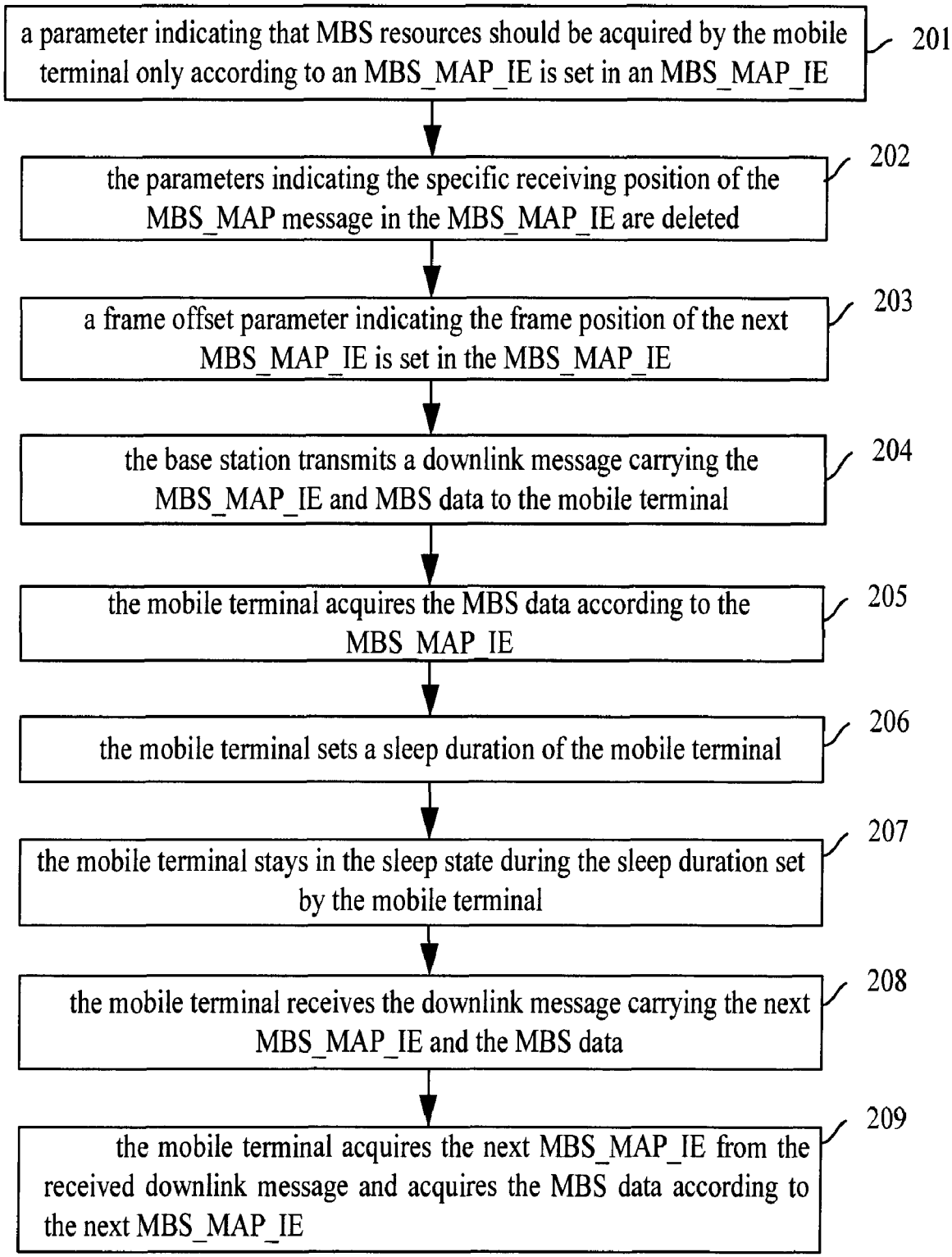
FIG. 2 is a flowchart illustrating a method for transmitting data according to another embodiment of the present invention.

FIG. 2 is a flowchart illustrating a method for transmitting data according to a second embodiment of the present invention. With reference to FIG. 2, when a mobile terminal is in a sleep mode and receives MBS data in a non macro diversity manner, the method for transmitting data according to the present invention includes the following processes.

The processes described at blocks 201 to 203 are substantively the same as those described at blocks 101 to 103.

At block 204, at the frame time point when the base station transmits the MBS data to the mobile terminal, the base station transmits a downlink message carrying the MBS_MAP_IE and MBS data to the mobile terminal.

The downlink message may be an existing DL_MAP message or a predefined message in the present invention.

Further, the difference between the MBS_MAP_IE carried in the downlink message at block 204 and the MBS_MAP_IE carried in the downlink message at block 106 described in the first embodiment is as follows. At block 106, the MBS_MAP_IE carries not only the value of the frame offset parameter indicating the frame offset of the next MBS_MAP_IE, but also the value of the symbol offset parameter indicating the symbol offset of the next MBS_MAP_IE and the value of the information element length parameter. And at block 204, the MBS_MAP_IE only carries the frame offset parameter indicating the frame offset of the next MBS_MAP_IE.

The processes described at blocks 205 to 206 are substantively the same as those described at blocks 107 to 108.

The processes described at block 207 are substantively the same as those described at block 111.

At block 208, the mobile terminal receives and acquires the downlink message carrying the next MBS_MAP_IE and the MBS data from the base station when the set sleep duration expires.

At block 209, the mobile terminal acquires the next MBS_MAP_IE from the received downlink message and acquires the MBS data according to the next MBS_MAP_IE.

The mobile terminal acquires the next MBS_MAP_IE from the downlink message through the following process. The mobile terminal parses all contents of the received downlink message and acquires the next MBS_MAP_IE carried in the downlink message according to parameters being carried in the downlink message, including: parameters indicating the type of each information elements and parameters indicating the length of each information element carried in the downlink message.

For example, the downlink message in the embodiment is the DL_MAP message. The DL_MAP message includes multiple information elements. Each information element is identified by a Downlink Interval Usage Code (DIUC). When the DIUC is 15, it means that each of the information currently received elements is an extended information element, and the MBS_MAP_IE is one of the extended information elements, Each of the extended information elements is further indicated by an Extended DIUC, and the Extended DIUC corresponding to MBS_MAP_IE is 0x00. Here, the "0x" means hexadecimal. In this way, at this block, the mobile terminal obtains the next MBS_MAP_IE from the DL_MAP message through the following process. The mobile terminal parses the received DL_MAP message. When the DIUC corresponding to an information element is parsed to be 15, the mobile terminal determines that the information element is an extended information element. When the Extended DIUC corresponding to a extended information element is parsed to be 0x00, the mobile terminal determines that the extended information element is the MBS_MAP_IE and then the mobile terminal acquires the length of the MBS_MAP_IE according to a parameter Length indicating the length of the information element in the determined MBS_MAP_IE, and thus the mobile terminal acquires the next MBS_MAP_IE.

In the second embodiment, two parameters are added, with one indicating that MBS resources can be acquired only according to the next MBS_MAP_IE and the other indicating the frame position of the next MBS_MAP_IE. It is unnecessary for the mobile terminal to receive the next MBS_MAP message, and the MBS resources are acquired only by receiving each MBS_MAP_IE. Therefore, the sleep duration of the mobile terminal increases, and the power consumption of the mobile terminal reduces. Moreover, parameters in the MBS_MAP_IE for indicating the next MBS_MAP message are deleted. It is unnecessary for the base station to transmit the MBS_MAP message to the mobile terminal. Therefore, air interface resources are saved, and bandwidth efficiency is improved.

The above are only preferred embodiments of the present invention and are not for use in limiting the protection scope of the present invention. All modifications, equivalent replacements or improvements made within the principles of the present invention should be covered under the protection scope of the present invention.

The invention claimed is:

1. A method for transmitting data, comprising:
   acquiring a Multicast and Broadcast Service Mapping Information Element (MBS_MAP_IE) carried in a DL_MAP message and MBS data corresponding to the MBS_MAP_IE, wherein the MBS_MAP_IE carries a parameter for indicating the frame position of a next MBS_MAP_IE;
   setting a sleep duration according to the parameter for indicating the frame position of the next MBS_MAP_IE; and
   acquiring the next MBS_MAP_IE carried in a next DL_MAP message and MBS data corresponding to the next MBS_MAP_IE when the sleep duration expires.

2. The method of claim 1, wherein the parameter for indicating the frame position of the next MBS_MAP_IE is a parameter for indicating the frame offset from the next MBS_MAP_IE to the MBS_MAP_IE; and
   the set sleep duration is the time duration corresponding to the parameter for indicating the frame offset from the next MBS_MAP_IE to the MBS_MAP_IE.

3. The method of claim 1, wherein the MBS_MAP_IE further carries a parameter for indicating the symbol offset from the next MBS_MAP_IE to the header of the frame comprising the next MBS_MAP_IE and a parameter for indicating the length of the next MBS_MAP_IE.

4. The method of claim 3, wherein acquiring the next MBS_MAP_IE comprises:
   acquiring the next MBS_MAP_IE according to the parameter for indicating the symbol offset from the next MBS_MAP_IE to the header of the frame comprising the next MBS_MAP_IE and the parameter for indicating the length of the next MBS_MAP_IE carried in the MBS_MAP_IE.

5. The method of claim 1, wherein the MBS_MAP_IE further carries a parameter for indicating the length of the next MBS_MAP_IE and a parameter for indicating the length of the MBS data.

6. The method of claim 5, wherein acquiring the next MBS_MAP_IE carried in the next DL_MAP message and MBS data comprises:
   acquiring the next MBS_MAP_IE carried in the next DL_MAP message and the MBS data during a listening duration; and the listening duration is set as the sum of the time duration corresponding to the parameter for indicating the length of the next MBS_MAP_IE and the time duration corresponding to the parameter for indicating the length of the MBS data.

7. The method of claim 1, wherein the acquiring the next MBS_MAP_IE carried in the next DL_MAP message comprises:
   acquiring the next MBS_MAP_IE from the next DL_MAP message according to parameters carried in the next DL_MAP message, wherein the parameters carried in the next DL_MAP message include a parameter for indicating the type of an information element and a parameter for indicating the length of the information element.

8. The method of claim 7, wherein acquiring the next MBS_MAP_IE from the next DL_MAP message comprises:
parsing the next DL_MAP message;
taking an information element as the next MBS_MAP_IE when a Downlink Interval Usage Code (DIUC) corresponding to the information element is parsed as 15 and an extended DIUC corresponding to the information element is parsed as 0x00;
acquiring the parameter for indicating the length of the information element; and
acquiring the next MBS_MAP_IE according to the acquired parameter for indicating the length of the information element.

9. An apparatus for transmitting data, comprising:
a first unit, configured to acquire a Multicast and Broadcast Service Mapping Information Element (MBS_MAP_IE) carried in a DL_MAP message and MBS data corresponding to the MBS_MAP_IE, wherein the MBS_MAP_IE carries a parameter for indicating the frame position of the next MBS_MAP_IE;
a second unit, configured to set a sleep duration according to the parameter for indicating the frame position of the next MBS_MAP_IE; and
wherein the first unit is further configured to acquire the next MBS_MAP_IE carried in a next DL_MAP message and MBS data corresponding to the next MBS_MAP_IE when the sleep duration expires.

10. The apparatus of claim 9, wherein the parameter for indicating the frame position of the next MBS_MAP_IE is a parameter for indicating the frame offset from the next MBS_MAP_IE to the MBS_MAP_IE; and
the second unit is further configured to the set sleep duration according to the parameter for indicating the frame offset from the next MBS_MAP_IE to the MBS_MAP_IE.

11. The apparatus of claim 9, wherein the MBS_MAP_IE further carries a parameter for indicating the length of the next MBS_MAP_IE and a parameter for indicating the length of the MBS data; and
the second unit is further configured to set the sum of the time duration corresponding to the length of the next MBS_MAP_IE and the time duration corresponding to the length of the MBS data as a listening duration; and
the first unit is further configured to acquire the next MBS_MAP_IE and the MBS data corresponding to the next MBS_MAP_IE, during the listening duration.

* * * * *